Dec. 8, 1970

G. H. PETERSON 3,545,018

METHOD AND APPARATUS FOR CUTTING MULTIPLE
THREADS IN LARGE WORKPIECES

Filed Dec. 14, 1967

GLENN H. PETERSON
INVENTOR

BY
BUCKHORN, BLORE, KLARQUIST & SPARKMAN
ATTORNEYS

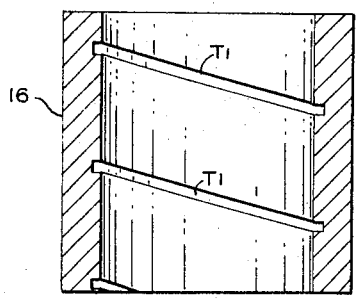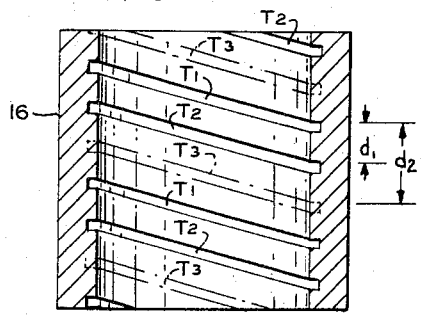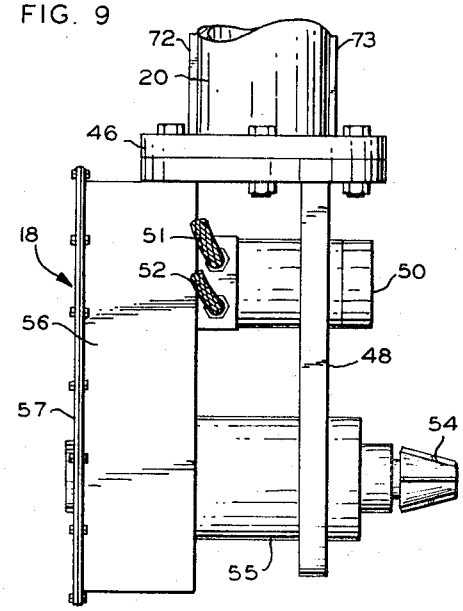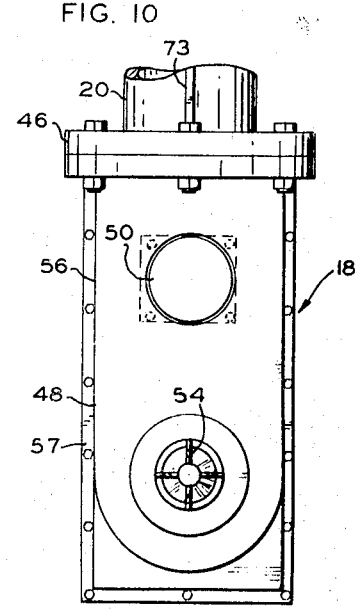

United States Patent Office 3,545,018
Patented Dec. 8, 1970

3,545,018
METHOD AND APPARATUS FOR CUTTING MULTIPLE THREADS IN LARGE WORKPIECES
Glenn H. Peterson, Lake Oswego, Oreg., assignor of one-half to Ardis Peterson, Lake Oswego, Oreg.
Filed Dec. 14, 1967, Ser. No. 690,473
Int. Cl. B23g 1/22; B23b 29/00, 1/00; B23c 3/28
U.S. Cl. 10—101    8 Claims

ABSTRACT OF THE DISCLOSURE

In a boring mill, the use of interchangeable index coupling spacer blocks of different thicknesses between the lead screw and the ram and a single thread cutting tool on the cutter head to cut multiple threads in a workpiece. The cutting tool is driven by a hydraulic motor mounted on the cutter head. The pitch of the threads can be varied by changing interchangeable gears on a speed-reducing unit which transmits rotary motion from a power source to a worm nut in driving engagement with the lead screw.

BACKGROUND OF THE INVENTION

Field of the invention

The present invention relates to the cutting of multiple threads in large workpieces.

Description of the prior art

In large, heavy threaded members having diameters of approximately ten inches or more, the threads formed are usually multiple threads. However, heretofore considerable difficulty has been encountered in cutting multiple threads in such large members because of the problem of obtaining and maintaining accurately the required distance between the adjacent multiple threads.

SUMMARY OF THE INVENTION

The foregoing problem of the prior art is overcome by the present invention through the provision of interchangeable index coupling spacers of different thicknesses corresponding to the desired distances between convolutions of multiple threads. The spacers are inserted successively between the lead screw and the ram connections of a boring mill after the first single thread has been cut to cut thereafter one, two or more additional single threads of the desired pitch and spacing from the initial thread, thereby to provide any number of accurately spaced, precision-cut multiple threads.

Principal objects of the invention are to provide:

(1) a new and improved method of cutting accurately multiple threads in large workpieces;

(2) a new and improved apparatus for carrying out the aforesaid method;

(3) apparatus as aforesaid which can be used in conjunction with conventional boring mills;

(4) apparatus as aforesaid including interchangeable index coupling spacer elements for insertion between the ram and lead screw of a boring mill;

(5) apparatus as aforesaid including a cutter head incorporating a single thread cutting tool and a hydraulic motor for driving the tool;

(6) apparatus as aforesaid including a speed reducing unit with interchangeable gears for cutting threads of different pitch; and (7) apparatus as aforesaid which is simple and economical to make, use and maintain.

BRIEF DESCRIPTION OF THE DRAWINGS

FIGS. 7 and 8 are vertical sections through a workpiece in different stages of completion illustrating the method of the present invention; and FIGS. 9 and 10 are side and front views, respectively, showing the cutter head position of the boring mill of FIG. 1 on an enlarged scale.

DETAILED DESCRIPTION

Figure 1:
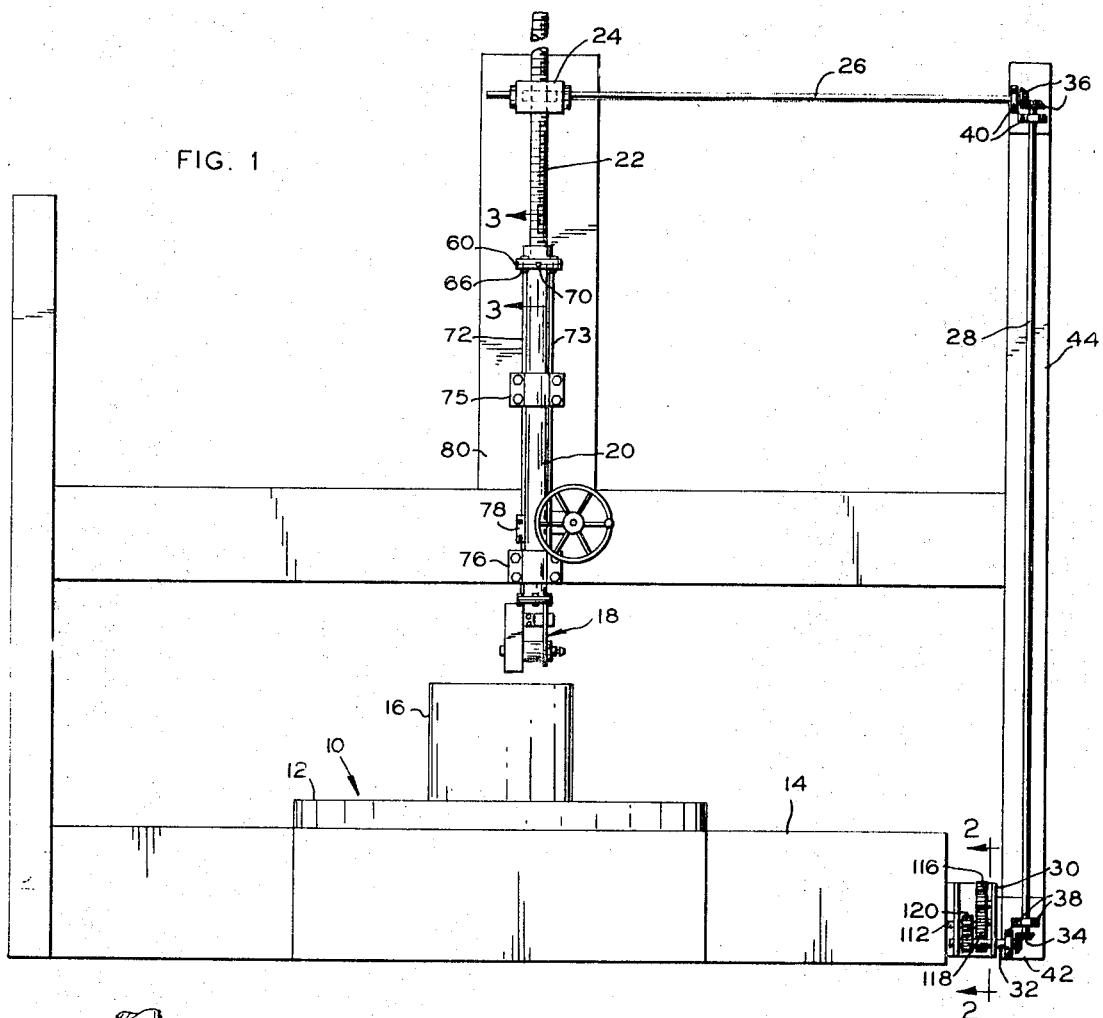
FIG. 1 is a side elevational view of a boring mill incorporating the present invention.

With reference to the drawings, FIG. 1 discloses a boring mill 10 having a worktable 12 rotatable about its vertical axis by a suitable power unit (not shown) within a base portion 14 of the mill. The worktable is adapted for fixedly mounting thereon large workpieces such as the hollow cylindrical workpiece 16.

A cutter head 18 carried by the distal end of a vertical ram 20 is raised and lowered into engagement with workpiece 16 by a lead screw 22. Lead screw 22 is raised and lowered by a worm nut 24 driven through cross shaft 26, vertical shaft 28 and a gear train 30 from a power take-off shaft 32. Miter gears 34, 36 drivingly interconnect the various shafts, which are suitably mounted in bearings 38, 40, supported by frame members 42, 44.

As shown in FIG. 9, cutter head 18 is joined to ram 20 at a flanged connection 46 from which a mounting plate 48 depends. Such plate mounts a hydraulic motor 50 supplied with fluid through lines 51, 52 from a remote source (not shown). A thread-cutting tool 54 is mounted in a bearing casing 55 carried in a lower opening of plate 48. The thread-cutter is driven from the hydraulic motor through a chain drive (not shown) within shrouding 56 of a rear mounting plate 57.

Figure 3:
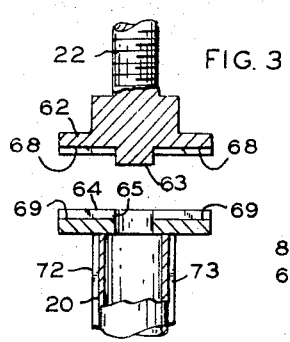
FIG. 3 is a view, partly in section, of the lower end of the lead screw and the upper end of the ram of FIG. 1 on an enlarged scale.

Ram 20 is joined to lead screw 22 at a coupling 60 which, as shown in FIG. 3, includes a flanged male connecting member 62 including a central plug 63 at the lower end of the lead screw and a correspondingly flanged female connecting member 64 with a central socket 65 at the upper end of the ram. Mating flanges 62 and 64 have bolt holes therethrough so that they can be drawn together and fastened by through bolts 66. The facing surfaces of opposed flanges 62, 64 are provided with radial keyways 68, 69 which receive keys 70 when the keyways of the opposed flanges are vertically aligned so as to prevent relative twisting movement between the ram and lead screw during the thread-cutting operation.

Opposed longitudinal ribs 72, 73 are also provided on ram 20 and slide within internal keyways (not shown) in guide brackets 75, 76 and in keyway block 78, which are fastened to frame member 80 to resist the tendency of the ram to twist while the cutter head is engaging revolving workpiece 16.

Figure 4:
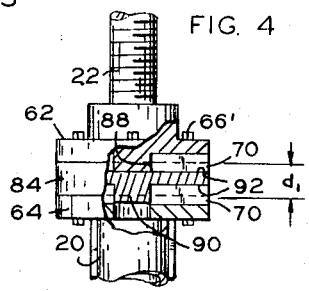
FIGS. 4 and 5 are views similar to that of FIG. 3 but with index couplings of different widths inserted between the ram and lead screw connections.
Figure 5:
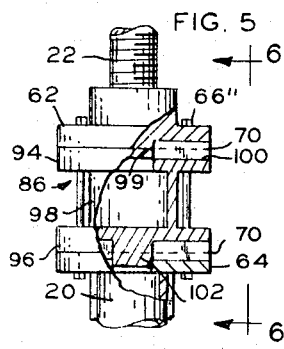
Figure 6:
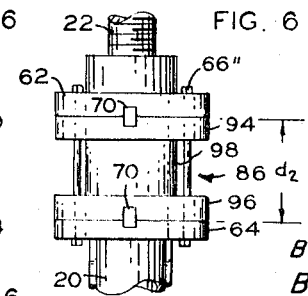
FIG. 6 is an elevational view showing the coupling of FIG. 5 as viewed along the line 6—6 of FIG. 5.

FIG. 4 on the one hand and FIGS. 5 and 6 on the other hand illustrate two interchangeable index spacer couplings 84, 86 of different predetermined thicknesses for insertion between flange coupling 62 of the lead screw and flange coupling 64 of the ram to provide precision spacing between multiple threads cut by thread-cutter 54 in a manner to be described. Spacer coupling 84 of FIG. 4 is the thinnest of the two shown and includes a single disc-like member having an upper surface with a central socket 88 for receiving plug 63 of the lead screw flange and having a lower surface with a central plug 90 for insertion in socket 65 of the ram flange. Both surfaces of the spacer member have radial keyways 92 for alignment with the corresponding keyways 68, 69 of the lead screw and ram flanges to permit insertion of keys 70 as shown. Bolt holes also extend through the spacer member so that through bolts 66' clamp the three interfitting coupling members 62, 64 and 84 together.

Spacer coupling 86 of FIG. 5, because of its great thickness, is built up to include an upper female flange 94 and a lower male flange 96 joined together by a tubular body portion 98 of reduced diameter. Upper flange 94 has a central socket 99 and radial keyways 100 for cooperation with the plug and keyways of lead screw flange 62. Lower flange 96 has a central plug 102 for insertion in the socket of ram flange 64, and radial keyways also. Bolts 66'' and keys 70 interconnect the interfitting spacer coupling and lead screw and ram flanges.

Figure 2:
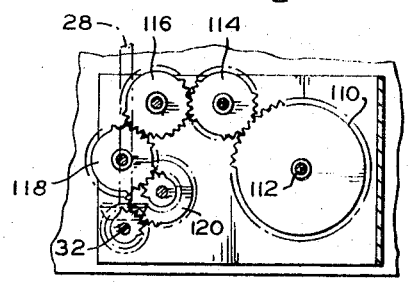
FIG. 2 is a vertical sectional view on an enlarged scale taken along the line 2—2 of FIG. 1 showing the speed-reducing unit of the apparatus.

The speed-controlling gear assembly 30, as shown in FIG. 2, includes a main gear 110 on a direct drive shaft 112 from the power unit and a series of smaller gears 114, 116, 118, 120. The gears can be rearranged or removed from their shafts to change the speed of output shaft 32 as desired and thus the rate of descent of lead screw 20 and pitch of the thread cut by thread-cutter 54.

FORMING MULTIPLE THREADS

Workpiece 16 is shown in FIG. 7 after a single internal thread $T_1$ has been cut in its inner wall by threadcutting tool 54. To cut this thread, workpiece 16 is slowly revolved on worktable 12 as cutter head 18 is lowered into the workpiece by the lead screw at a constant predetermined rate corresponding to the pitch of the thread desired, with thread-cutter 54 rotating. As thread-cutter 54 cuts its way down through the revolving workpiece, the single continuous helical thread $T_1$ is formed.

During the cutting of thread $T_1$, the ram is joined directly to the lead screw without the insertion of any spacer coupling such as shown in FIGS. 4 and 5.

Following the cutting of thread $T_1$, cutter head 18 is raised from the workpiece, the ram and lead screw are disconnected, and spacer coupling 84 having predetermined overall thickness $d_1$ is inserted between lead screw flange 62 and ram flange 64. Then the ram and lead screw are rejoined with the intervening spacer coupling between them as shown in FIG. 4. Subsequently, rotating cutter 54 is again lowered into engagement with revolving workpiece 16 at the same rate as before, resulting in the cutting of a second thread $T_2$ in the workpiece having the same pitch as thread $T_1$, as shown in FIG. 8. Moreover, thread $T_2$ will be spaced axially from thread $T_1$, a distance $d_1$ corresponding to the thickness of the spacer coupling.

Thereafter, a third thread $T_3$ may be cut in workpiece 16 if desired, by replacing spacer coupling 84 with a second, thicker spacer coupling 86 of FIG. 6 having a thickness $d_2$ equal to the spacing desired between the first thread $T_1$ and the third thread $T_3$. Then the thread-cutting operation is repeated with cutter 54 descending into the workpiece at the same rate as before to cut thread $T_3$ having the same pitch as the previously cut threads $T_1$ and $T_2$.

By using the foregoing procedure and interchangeable spacer couplings as described, any number of multiple threads of any desired predetermined spacing may be cut in large workpieces. Furthermore, any desired thread form can be cut by selection of an appropriate cutting tool 54. Also, the pitch of the threads cut can be varied simply by changing the rate of descent of the lead screw, which is accomplished easily through a rearrangement or replacement, as required, of the speed change gears 30.

Having illustrated and described a preferred form of the invention, it should be apparent to those skilled in the art that the same permits of modification in arrangement and detail. I claim as my invention all such modifications as come within the true spirit and scope of the following claims.

I claim:
1. A method of cutting multiple threads of constant predetermined pitch on a conventional boring mill including a rotatable worktable, a ram movable toward said worktable, driven means detachably connected to said ram for moving said ram toward said worktable, and a cutter head connected to the distal end of said ram, said method comprising the steps:
attaching to said cutter head a thread-cutting tool for cutting a single thread,
securing a workpiece to said table,
moving said ram and attached cutter head and thread-cutting tool toward and into said workpiece at a predetermined constant rate while simultaneously rotating said worktable and thus said workpiece at a constant rate to cut a first single thread of constant pitch into said workpiece,
then changing the distance between the interconnected ends of said ram and driven means an amount equal to the axial center distance desired between multiple threads,
then again moving said ram and attached cutter head and the same said thread-cutting tool toward and into said workpiece at the same said predetermined constant rate as before while simultaneously rotating said worktable and thus said workpiece at the same said constant rate before so as to cut a second single thread between the convolutions of said first single thread having a pitch equal to that of said first thread.

2. Apparatus for cutting multiple threads of constant pitch in large workpieces comprising:
a worktable for securing a workpiece,
a ram moveable axially toward and away from said worktable,
said worktable and ram being relatively rotatable to effect relative rotation between said workpiece and said ram,
a toolholder on the distal end of said ram,
feed means for moving said ram toward said worktable at a predetermined constant rate,
means for interconnecting said feed means and said ram comprising first connecting means on one end of said feed means and second connecting means on the adjacent end of said ram for mating directly with said first connecting means,
a cutter head comprising a single router-type cutting element mounted on said toolholder and extending radially toward a workpiece on said worktable,
and plural interchangeable spacer-type coupling means of different predetermined axial dimensions corresponding to the desired axial center distances between a first thread cut by said cutting element and subsequent threads cut by said cutting element in the same workpiece,
said plural coupling means being selectively insertable between said first and second connecting means.

3. Apparatus according to claim 2 wherein one of said first and second connecting means comprises a female connecting member, the other of said first and second connecting means comprises a male connecting member, and said spacer means includes a male connecting portion for interconnection with said female member and a female connecting portion for interconnection with said male connecting member.

4. Apparatus according to claim 2 wherein each of said first and second connecting means and spacer means includes flange means for abutment with one another and keyway means in each of said flange means for mutual alignment, said securing means including key means for insertion in said aligned keyway means.

5. Apparatus according to claim 4 wherein one of said first and second connecting means includes a male connecting portion, the other of said first and second connecting means includes a mating female connecting portion, and said spacer means includes both male and female connecting portions.

6. Apparatus according to claim 5 wherein said flange means have bolt holes therethrough mutually aligned when said keyway means of the different said flange means are mutually aligned, said securing means including bolt means for insertion through said bolt holes.

7. Apparatus according to claim 2 wherein said cutter head means includes metal cutting tool means, bearing means mounting said tool means, hydraulic motor means, including transmission means transmitting rotary power from said motor means to said tool means, and common mounting means mounting said motor means, transmission means and tool means at the distal end of said ram.

8. Apparatus according to claim 2 wherein said drive means includes a lead screw means in axial alignment with said ram, worm nut means in threaded engagement with said lead screw means, a prime mover, speed changing means, and shaft means interconnecting said prime mover, speed changing means and worm nut means, said speed changing means including a plurality of interchangeable gear means whereby the rate of axial movement can be changed so as to vary the rate of cutting of said cutter head means in the direction of said axial movement.

References Cited

UNITED STATES PATENTS

| | | | |
|---|---|---|---|
| 67,878 | 8/1867 | Hurd | 287—130 |
| 707,357 | 8/1902 | Rudd | 287—130 |
| 1,096,257 | 5/1914 | McClure | 90—11.66 |
| 2,585,113 | 2/1952 | Gredell | 287—129 |
| 3,097,006 | 7/1963 | Logue | 287—129 |
| 3,256,542 | 6/1966 | Schubert | 10—139 |
| 3,334,495 | 8/1967 | Jensen et al. | 287—129 |

FOREIGN PATENTS

| | | |
|---|---|---|
| 686,653 | 1/1953 | Great Britain. |
| 1,141,513 | 12/1962 | Germany. |

CHARLES W. LANHAM, Primary Examiner

E. M. COMBS, Assistant Examiner

U.S. Cl. X.R.

77—4; 82—5; 90—11.5, 11.66